(12) United States Patent  
Kim et al.

(10) Patent No.: US 8,150,382 B2  
(45) Date of Patent: Apr. 3, 2012

(54) METHOD AND APPARATUS FOR DATE-BASED INTEGRATED PROCESSING OF DATA IN MOBILE TERMINAL

(75) Inventors: Jung Hun Kim, Busan (KR); Young Ho Rhee, Seoul (KR); Jae Hwan Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 785 days.

(21) Appl. No.: 12/115,265

(22) Filed: May 5, 2008

(65) Prior Publication Data

US 2008/0274722 A1    Nov. 6, 2008

(30) Foreign Application Priority Data

May 4, 2007  (KR) .................. 10-2007-0043599  
May 4, 2007  (KR) .................. 10-2007-0043600  
May 4, 2007  (KR) .................. 10-2007-0043601  
May 4, 2007  (KR) .................. 10-2007-0043690

(51) Int. Cl.  
*H04W 4/00*  (2009.01)

(52) U.S. Cl. ........ 455/418; 455/566; 709/201; 709/203; 715/203; 715/277

(58) Field of Classification Search ............ 455/418, 455/466, 566; 709/201, 203, 214; 715/203, 715/277  
See application file for complete search history.

(56) References Cited

U.S. PATENT DOCUMENTS

| 6,415,316 | B1 * | 7/2002 | Van Der Meer | 709/203 |
| 2006/0035632 | A1 * | 2/2006 | Sorvari et al. | 455/418 |

FOREIGN PATENT DOCUMENTS

| EP | 1 729 214 | 12/2006 |
| JP | 2003-173309 | 6/2003 |
| KR | 1020030001363 | 1/2003 |
| KR | 1020050047490 | 5/2005 |
| KR | 1020050047491 | 5/2005 |
| KR | 1020060112686 | 11/2006 |
| KR | 1020060130810 | 12/2006 |
| KR | 1020080092645 | 10/2008 |
| KR | 1020080093198 | 10/2008 |
| KR | 1020080093566 | 10/2008 |
| KR | 1020080097059 | 11/2008 |
| KR | 1020080098207 | 11/2008 |
| KR | 1020080098208 | 11/2008 |
| KR | 1020090013267 | 2/2009 |

* cited by examiner

*Primary Examiner* — Pierre-Louis Desir  
(74) *Attorney, Agent, or Firm* — The Farrell Law Firm, P.C.

(57) ABSTRACT

A method and apparatus wherein data generated in a mobile terminal can be classified in an integrated manner based on dates and can be displayed in various forms. User data generated in the mobile terminal can be processed by the mobile terminal or can be sent to and processed by a separate information processing appliance. The data processing method includes executing an integrated data processing application; selecting a reference date; collecting pieces of data created at the reference date regardless of their types; processing the collected pieces of data in an integrated manner according to preset processing conditions; and displaying processing results together with associated screens of the integrated data processing application. The integrated data processing application can be, for example, a life diary application.

23 Claims, 12 Drawing Sheets

METHOD AND APPARATUS FOR DATE-BASED INTEGRATED PROCESSING OF DATA IN MOBILE TERMINAL

PRIORITY

This application claims priority under 35 U.S.C. §119(a) to applications filed in the Korean Intellectual Property Office on May 4, 2007 and assigned Serial Nos. 2007-43599, 2007-43600, 2007-43601, and 2007-43690, the contents of each of which are incorporated herein by reference.

BACKGROUND OF THE INVENTION

1. Field of the Invention

The present invention generally relates to data processing for a mobile terminal and, more particularly, to a method and apparatus for integrated processing of data in a mobile terminal, wherein all types of user data generated in the mobile terminal is classified based on dates, processed in an integrated manner, and displayed in various forms by the mobile terminal or a separate information processing appliance.

2. Description of the Related Art

Advances in information and communication technologies have enabled popularization of various kinds of mobile terminals. Mobile phones, digital cameras, personal digital assistants, Moving Picture Experts Group Level 3 (MP3) audio players, portable multimedia players, mobile broadcast receivers, portable navigation assistants, and electronic dictionaries are examples of modern mobile terminals. With the mobile convergence trend, an advanced mobile terminal tends to support plural functions that have been evolved from different kinds of mobile terminals. For example, in addition to conventional phone call processing and text message processing, an advanced mobile phone can support various functions related to photographing, video telephony, multimedia data communication, wireless Internet, short-range wireless communication, and mobile broadcast reception.

A mobile terminal can generate and store a large amount of data. For example, a mobile phone can store log data regarding sent and received calls and messages, user created data such as schedules and memos, and multimedia data such as images, audios and videos. Increases both in type and amount of data have necessitated effective means for classifying and displaying the data.

In conventional approaches to data processing for mobile terminals, data is processed separately according to types. For example, call logs are sorted in order of time among themselves without other types of data. In addition, call logs can be displayed only through related menus without display of other types of data. Conventional data processing approaches may be sufficient for a small amount of data with a small number of types. However, in the case of a large amount of data with a large number of types, such conventional data processing approaches may cause inconvenience to users and lower effectiveness of mobile terminals. Therefore, a need exists for an effective means to process a large amount of data generated by a mobile terminal in an integrated manner.

SUMMARY OF THE INVENTION

The present invention substantially overcomes the above problems, and provides a method and apparatus wherein data generated in a mobile terminal can be efficiently classified and displayed in various forms.

The present invention also provides a method and apparatus wherein various data generated in a mobile terminal can be processed in an integrated manner.

The present invention further provides a method and apparatus wherein data generated in a mobile terminal can be processed by the mobile terminal or be sent to and processed by a separate information processing appliance.

The present invention further provides a method and apparatus that can raise effectiveness of data generated in a mobile terminal and enhance user convenience.

The present invention further provides a method and apparatus that can automatically compose a user diary using data generated in a mobile terminal.

In accordance with an aspect of the present invention, there is provided a method and apparatus for integrated processing of data in a mobile terminal, wherein all types of user data generated in the mobile terminal is classified based on dates, processed in an integrated manner, and displayed in various forms.

In accordance with another aspect of the present invention, there is provided a data processing apparatus for a mobile terminal, the apparatus including a storage unit for storing user data and an integrated data processing application; a display unit for displaying data and screens of the integrated data processing application; an integrated data processing module for selecting a reference date, collecting pieces of data created at the reference date from the storage unit, and processing the collected pieces of data in an integrated manner according to preset processing conditions by executing the integrated data processing application; and an application management module for reading the integrated data processing application from the storage unit for execution, and displaying processing results on the display unit together with associated screens of the integrated data processing application.

The data processing apparatus may further include a data creation module for creating, in response to an event, a piece of data and storing the created piece of data in the storage unit, and a communication unit for sending and receiving a piece of data through a wired or wireless connection.

In accordance with a further aspect of the present invention, there is provided a data processing method for a mobile terminal, the method including executing an integrated data processing application for integrated processing of user data; selecting a reference date; collecting pieces of data created at the reference date regardless of their types; processing the collected pieces of data in an integrated manner according to preset processing conditions; and displaying processing results together with associated screens of the integrated data processing application.

The data processing method may further include creating, in response to an event before execution of the integrated data processing application, a piece of data and storing the created piece of data. The data processing method may further include detecting, before execution of the integrated data processing application, connection of the mobile terminal having created data; and receiving the data from the mobile terminal. The data processing method may further include sending, after processing the collected pieces of data, the processing results to the mobile terminal. The data processing method may further include: inputting, after display of the processing results, a key signal; checking the input key signal; and performing a necessary procedure indicated by the input key signal.

In accordance with still another aspect of the present invention, there is provided a data processing method for a mobile terminal, the method including detecting connection of the mobile terminal; executing an integrated data processing application for integrated processing of user data; requesting the mobile terminal to send pieces of data created at a reference date; receiving the pieces of data created at the reference date from the mobile terminal; processing the received pieces of data in an integrated manner according to preset processing conditions; and displaying processing results together with associated screens of the integrated data processing application.

The data processing method may further include sending, after processing the received pieces of data, the processing results to the mobile terminal. The data processing method may further include inputting, after display of the processing results, a key signal; checking the input key signal; and performing a procedure indicated by the input key signal.

In the data processing method and apparatus, the integrated data processing application can be, for example, a life diary application.

BRIEF DESCRIPTION OF THE DRAWINGS

The aspects, features and advantages of the present invention will be more apparent from the following detailed description in conjunction with the accompanying drawings, in which.

DETAILED DESCRIPTION OF THE PREFERRED EMBODIMENTS

Figure 1:
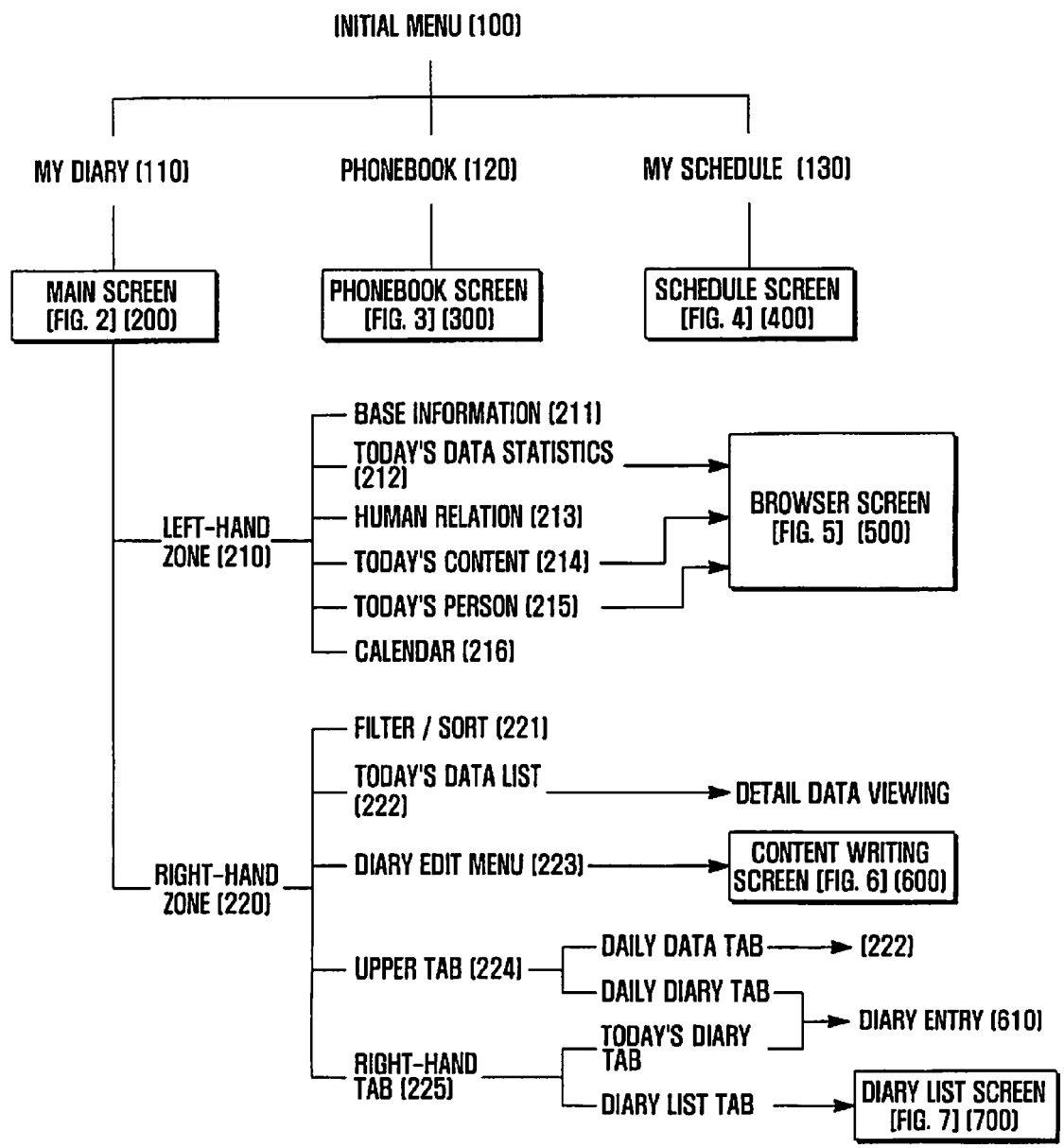
FIG. 1 illustrates a menu structure and screen layout of a life diary application according to the present invention.

Hereinafter, preferred embodiments of the present invention are described in detail with reference to the accompanying drawings. The same reference symbols identify the same or corresponding elements in the drawings. Detailed descriptions of constructions or processes known in the art may be omitted to avoid obscuring the invention in unnecessary detail.

First, for the purpose of description, definitions of several terms used herein are as follows.

The phrase 'created data' denotes all kinds of data created or generated in a mobile terminal, such as log data, messages, electronic mails, schedules, memos, alarms, images, videos, audios, and diaries. The created data includes data created or written by the user of the mobile terminal, and data received or downloaded from other persons. The created data may be referred to as 'user data'.

The phrase 'log data' denotes a record of communication related activities, such as a list of sent and received calls, list of unanswered calls, list of sent and received messages, list of sent and received e-mails, and use of instant messaging.

The phrase 'data type' denotes kinds of data, such as calls, messages, e-mails, schedules, memos, images, videos, audios, and diaries.

The phrase 'data attribute' denotes attributes of data, such as type, date of creation, size, format, and creator. For example, a piece of data may be created on Jan. 1, 2007, and have a size of 360 Kbytes (Kilobytes) and a format of txt, jpg, avi or mp3. The creator of data refers to a person who created the data, and can be either the user if the data is created by the user or the sender if the data is received elsewhere.

The phrase 'data tag' denotes a brief description attached to a piece of data by the user. Data tags may refer to index words.

The term 'event' denotes all kinds of causes resulting in creation of data in a mobile terminal, such as transmission and reception of calls, reception of calls in unanswered states, transmission and reception of messages, transmission and reception of e-mails, use of instant messaging, scheduling, writing memos, setting alarms, photographing or reception of images, photographing or reception of videos, recording or reception of audios, and writing or reception of diaries.

According to the present invention, a data processing apparatus for a mobile terminal executes a date-based integrated data processing application. Such an integrated application can be a life diary application, as well as other applications.

FIG. 1 shows a menu structure and screen layout of a life diary application according to the present invention.

Figure 2:
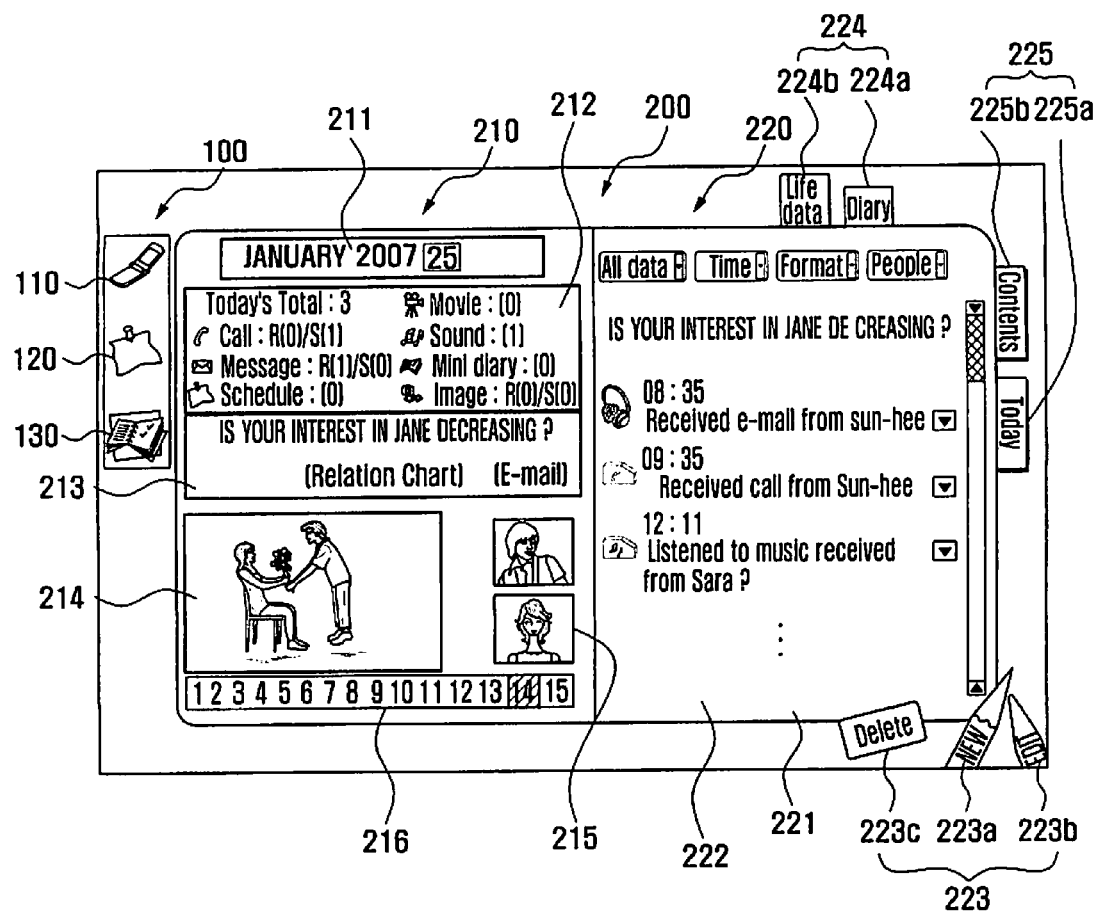
FIG. 2 illustrates an initial menu and main screen of the application of FIG. 1.

Referring to FIG. 1, the life diary application has an initial menu 100, which includes a my diary item 110, phonebook item 120, and my schedule item 130. Selection of the my diary item 110 in the initial menu 100 results in display of a main screen 200, as shown in FIG. 2. FIG. 2 illustrates the initial menu 100 and main screen 200 of the life diary application of FIG. 1.

Figure 3:
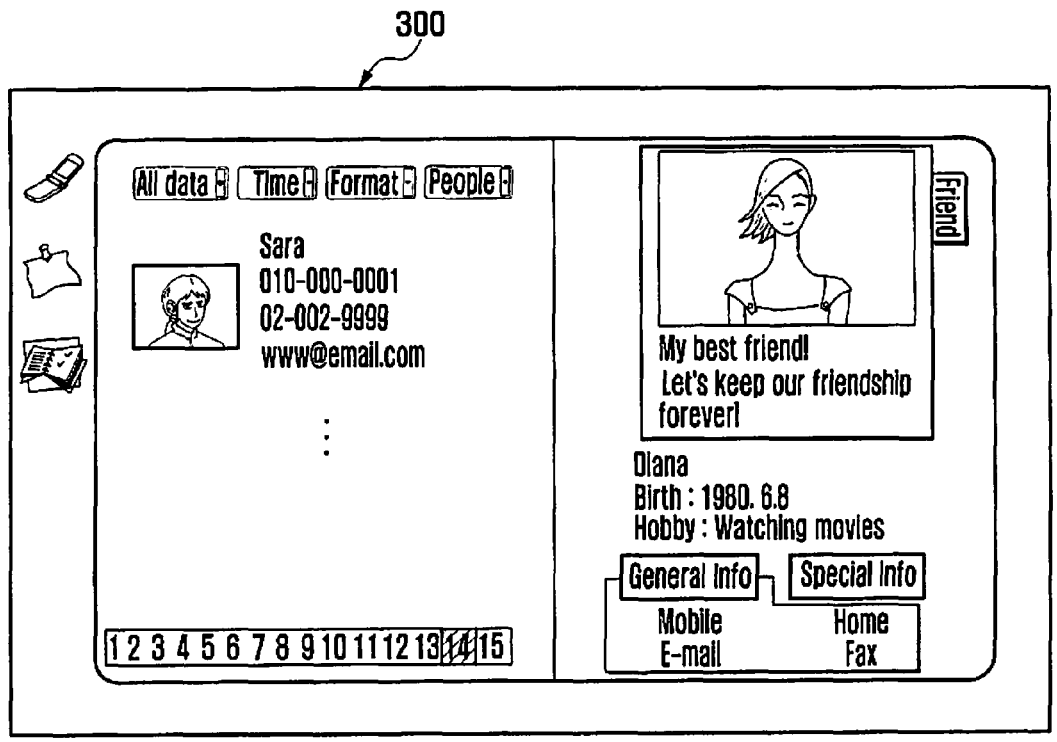
FIG. 3 illustrates a phonebook screen of the application of FIG. 1.
Figure 4:
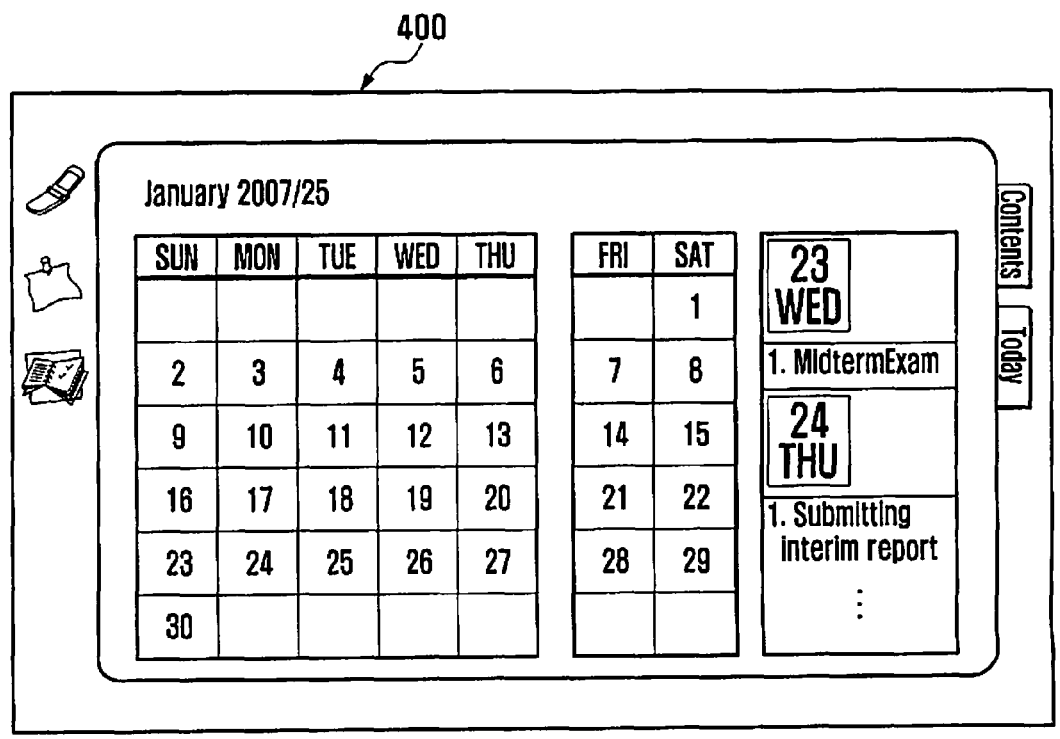
FIG. 4 illustrates a schedule screen of the application of FIG. 1.

Selection of the phonebook item 120 in the initial menu 100 results in display of a phonebook screen 300 as illustrated in FIG. 3. Selection of the my schedule item 130 results in display of a schedule screen 400, as shown in FIG. 4. FIG. 3 illustrates the phonebook screen 300 of the application of FIG. 1, and FIG. 4 illustrates the schedule screen 400 of the application of FIG. 1. The phonebook screen 300 and schedule screen 400 are described later.

Referring to FIGS. 1 and 2, the main screen 200 is displayed in the form of an analog diary, the initial menu 100 is displayed at the upper left corner of the main screen 200. The main screen 200 is generally divided into a left-hand zone 210 and right-hand zone 220.

The left-hand zone 210 includes base information 211, today's data statistics 212, human relation information 213, today's content 214, today's person 215, and calendar 216. The right-hand zone 220 includes a filter/sort 221, today's data list 222, diary edit menu 223, upper tab 224, and right-hand tab 225.

In the left-hand zone 210 of the main screen 200, the base information 211 is used to display the date of the current day by default. When the user selects a date through the calendar 216 or a diary entry of a particular date through a diary entry list, the base information 211 indicates the corresponding selected date. For the purpose of description, the base information 211 is assumed to indicate the date of the current day. The base information 211 may also be used to display today's weather conditions and feelings of the user. Weather conditions or feelings of the user may be received through the Web, derived through analysis of created data, or set by a user selection.

Figure 5:
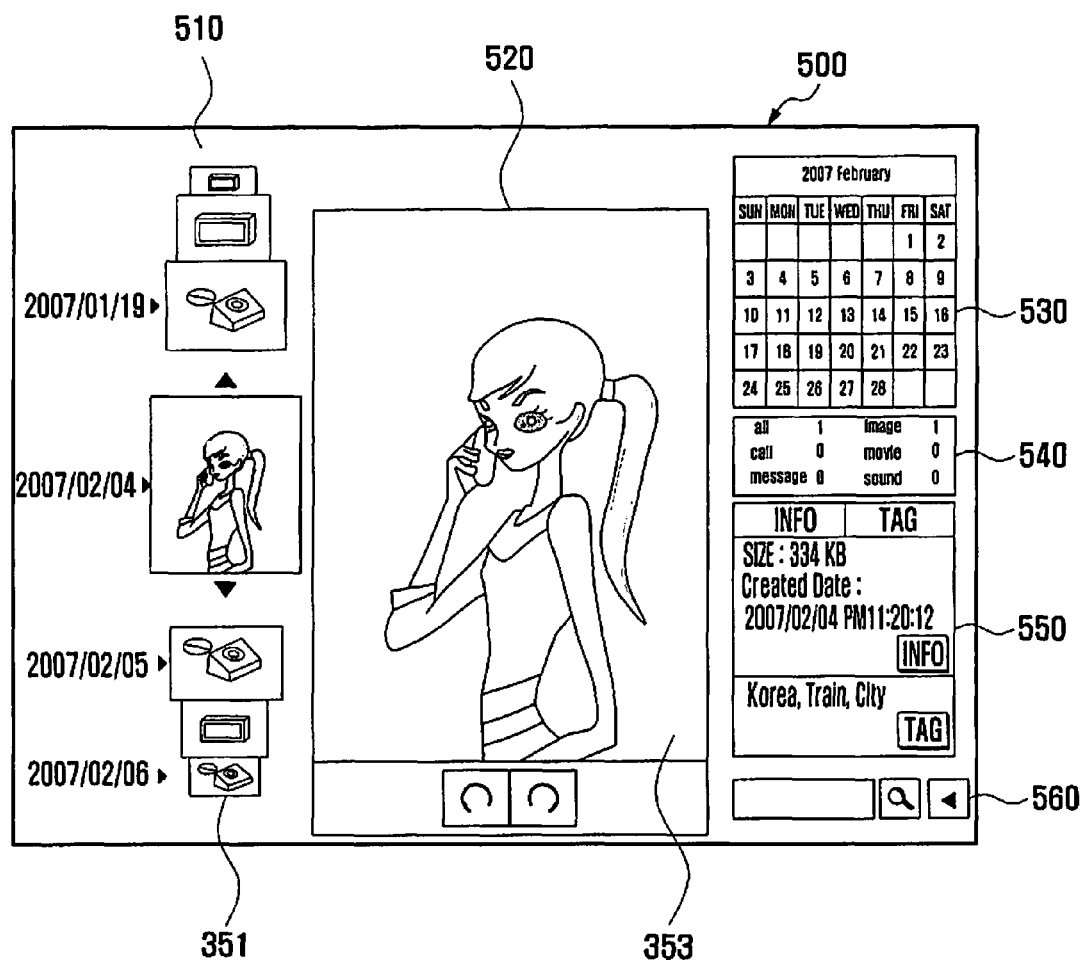
FIG. 5 illustrates a browser screen of the application of FIG. 1.

The today's data statistics 212, as shown by "Today's Total" in FIG. 2, is used to show classified statistics of all data created on the current day. For example, calls can be classified into sent calls, received calls and unanswered calls, and call statistics can be obtained and displayed according to the classification. Messages can be classified into sent messages and received messages, and message statistics can be obtained and displayed accordingly. Similarly, e-mails can be classified into sent e-mails and received e-mails, and e-mail statistics can be obtained and displayed accordingly. The today's data statistics 212 can be displayed in a text mode as shown or in a graphic mode. The user can change the display modes using an icon arranged at the lower right of the today's data statistic 212. Selection of a particular type in the today's data statistic 212 results in display of a browser screen 500, as shown in FIG. 5, thereby enabling the user to view data of the selected type in detail. The browser screen 500 is described later in connection with FIG. 5.

The human relation information 213 is used to show recent trends in human relations for individual communication counterparts through analysis of log data. Derivation of human relation information through analysis of log data is disclosed in Korean Patent Application No. 2007-36237, filed by the same applicants as the present invention, which is incorporated herein by reference. Although some technical terms in the present specification may have slightly different meanings from those of corresponding terms in Korean Patent Application No. 2007-36237, one in the relevant art can readily understand these terms.

The today's content 214, as shown in "Today's Contents" in FIG. 2, is used to display each data created or written today by the user. That is, the today's content 214 is used to display data created today that has a creator attribute 'user'. Pressing a left button or right button arranged at the lower end of the today's content 214 results in display of previous data or next data. Relevant data may also be displayed in a circular manner. Selection of currently displayed data results in display of a browser screen 500, as shown in FIG. 5, thereby enabling the user to view the selected data in more detail. The browser screen 500 is described later in connection with FIG. 5.

The today's person 215, as shown in "Persons in my life" in FIG. 2, is used to display other persons related to data created today in order of frequency. That is, pieces of data created today that have a creator attribute 'other' are classified according to creators and summarized in total. Similarly to the case of the today's content 214, pressing a left button or right button results in display of the previous person or next person. Relevant persons may also be displayed in a circular manner. Selection of the currently displayed person results in display of a browser screen 500, as shown in FIG. 5, thereby enabling the user to view both the selected person and data related to the selected person in more detail.

The calendar 216 is used to list dates within a preset duration relative to the present date. For example, dates between 7 days prior to the present date and 7 days after the present date, or dates between 10 days prior to the present date and the present date may be listed. When a particular date is selected through the calendar 216, operations related to the base information 211, today's data statistics 212, today's content 214, and today's person 215 are performed based on the selected date.

In the right-hand zone 220 of the main screen 200, the filter/sort 221 is used to selectively add data created today to the today's data list 222 by filtering the data according to data types or by sorting the data according to times, formats, or person names. Filtering means extracting pieces of data of the selected data type from data created today for display. Sorting means arranging pieces of data created today in a descending or ascending order in terms of times, formats, or person names. Sorting according to formats or person names may be replaced with filtering.

The today's data list 222 is used to list individual pieces of data created today. Pieces of data are listed in order of time by default, and can be selectively listed using the function of the filter/sort 221. Each piece of data is displayed together with assigned attributes and a data tag. Those pieces of data received elsewhere may be displayed together with sender names. When a particular sender name is selected, a function associated with the piece of data related to the selected sender name is performed.

When a piece of data in the today's data list 222 is selected by the user, details of the selected piece of data are displayed immediately below the selected piece of data through a detail data viewing operation (not shown). Activation of the detail data viewing operation causes display of all kinds of information related to the selected piece of data. Reselection of the detail data viewing operation results in deactivation of the detail data viewing operation, and the detailed information disappears from the screen. Alternatively, selection of the detail data viewing operation may result in display of a browser screen 500, similar to the one shown in FIG. 5.

The diary edit menu 223 includes diary composition 223a, diary revision 223b, and diary removal 233c. Selection of the diary composition 223a leads to display of a content writing screen 600, through which the user can write a new diary entry 610. The content writing screen 600 and diary entry 610 are described later in connection with FIG. 6. Selection of the diary revision 223b causes display of an existing diary entry 610 on the content writing screen 600, and the user can make an amendment to the existing diary entry 610. Selection of the diary removal 233c causes a diary entry 610 in display to be removed.

The upper tabs 224 include a daily data tab 224a, as shown in "Life Data" in FIG. 2, and a daily diary tab 224b. Selection of the daily data tab 224a causes display of the today's data list 222, as shown in FIG. 2, and selection of the daily diary tab 224b causes display of a diary entry 610 written by the user.

The right-hand tabs 225 include a today's diary tab 225a and diary list tab 225b. Selection of the today's diary tab 225a causes display of a diary entry 610 written today. Selection of the diary list tab 225b causes display of a diary list screen 700, and selection of a particular date causes display of a diary entry 610 written at the selected date. The diary list screen 700 is described later in connection with FIG. 7.

The main screen 200 and related functions are also disclosed in Korean Patent Application No. 2007-43600, filed by the same applicants as the present invention, which is incorporated herein by reference. Although some technical terms in the present specification may have slightly different meanings from those of corresponding terms in Korean Patent Application No. 2007-43600, one in the relevant art can readily understand these terms.

As described previously, selection of the phonebook item 120 in the initial menu 100 results in display of the phonebook screen 300, as shown in FIG. 3. The phonebook screen 300 is displayed in the form of an analog booklet, similar to the main screen 200 of FIG. 2, and may cooperate with an information processing appliance such as a mobile terminal, computer, Web server, terminal connected to the Web, etc.

Selection of the my schedule item 130 in the initial menu 100 results in display of the schedule screen 400, as shown in FIG. 4. The schedule screen 400 is displayed in the form of an analog booklet, and may cooperate with an information processing appliance, such as a mobile terminal, computer, Web server, terminal connected to the Web, etc.

Next, the browser screen 500 is described in connection with FIG. 5.

The browser screen 500 enables a user to view and navigate various data. In particular, the browser screen 500 can display various data created on the current day based on user requests. For example, when a particular type is selected through the today's data statistics 212 of the main screen 200 in FIG. 2, data that is created today and of the selected type can be viewed. When the today's content 214 is selected, data created or written today by the user can be viewed. When the today's person 215 is selected, data that is created today by persons other than the user can be viewed. The browser screen 500 may be displayed as a pop-up on a dark window covering the main screen 200. When the browser screen 500 is closed, the main screen 200 reappears.

The browser screen 500 is composed of plural areas, and includes a listing area 510 at the left end. In the listing area 510, pieces of data currently selected are listed as icons or thumbnails in order of time. The pieces of data are arranged vertically in the listing area 510, and the piece of data in the middle is displayed in a detail display area 520 in an enlarged form. The piece of data in the middle of the listing area 510 is displayed in the largest form, and remaining pieces of data are displayed in forms becoming smaller at a preset ratio with distances from the middle. When the user navigates the pieces of data arranged in the listing area 510, the pieces of data are rotated in the form of a mill wheel according to scrolling operations of the user.

The detail display area 520 is provided at a central region of the browser screen 500, and is used to display in detail a selected one of the pieces of data arranged in the listing area 510. The detail display area 520 can be displayed in a full screen mode, and can display the previous data or next data depending upon input of the left button or right button provided at the lower end.

At the right-hand region of the browser screen 500, a calendar 530, filter 540, attribute/tag 550, and search input box 560 are provided. At the calendar 530, the creation date of a piece of data displayed in the detail display area 520 is displayed in a manner visually distinguishable from other dates, and creation dates of pieces of data arranged in the listing area 510 can also be displayed in a visually distinguishable manner. The filter 540 illustrates statistics of the pieces of data arranged in the listing area 510 according to their types. When a particular type is selected through the filter 540, pieces of data of the selected type among the data arranged in the listing area 510 are newly arranged. The attribute/tag 550 is used to display attributes and tags of a piece of data currently displayed in the detail display area 520. The search input box 560 is used to find a piece of data having a particular tag.

The browser screen 500 and arrangement of data in the form of a mill wheel are disclosed in detail in Korean Patent Application No. 2007-36785, and Korean Patent Application No. 2007-42157, which have been filed by the same applicants as the present invention and are incorporated herein by reference. Although some technical terms in the present specification may have slightly different meanings from those of corresponding terms in Korean Patent Application Nos. 2007-36785 and 2007-42157, one in the relevant art can readily understand these terms. For example, the 'browser screen' of the present invention corresponds to a 'user content search screen' in these applications.

Figure 6:
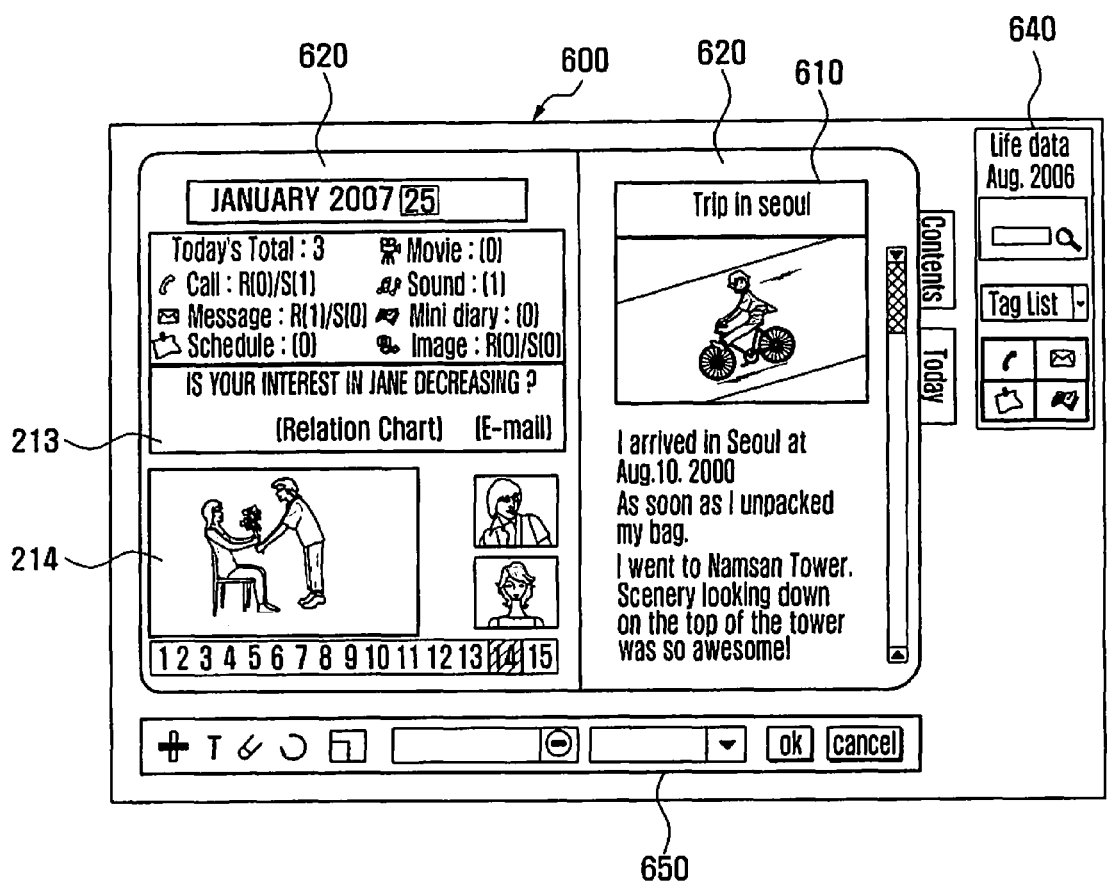
FIG. 6 illustrates a content writing screen of the application of FIG. 1.

Next, the content writing screen 600 is described in connection with FIG. 6.

The content writing screen 600 appears when the user writes or revises a diary entry through the diary edit menu 223 in the main screen 200 of FIG. 2. The content writing screen 600 includes a left-hand zone 620, right-hand zone 630, data list 640, and tool bar 650. The left-hand zone 620 corresponds to the left-hand zone 210 of the main screen 200, and the right-hand zone 630 corresponds to the right-hand zone 220 of the main screen 200 except that a diary entry 610 is displayed instead of the today's data list 222.

The data list 640 arranges pieces of data, as icons or thumbnails, in order of creation date. Pieces of data in the data list 640 can be selected using years and months of creation, and functions such as search, filter/sort, and tag selection. The user can select a piece of data in the data list 640 and add the selected piece of data to the right-hand zone 630 through a drag-and-drop operation. The tool bar 650 includes various tools for writing or editing a diary entry 610 in the right-hand zone 630, and editing a piece of data dragged from the data list 640.

The content writing screen 600 and data list 640 are disclosed in detail in Korean Patent Application No. 2007-43599, and Korean Patent Application No. 2007-43601, which have been filed by the same applicants as the present invention and are incorporated herein by reference. For example, to write a diary entry, as disclosed in these applications, the user can select a desired one of various subject templates through a 'content selection screen' before use of the content writing screen 600. Although some technical terms in the present specification may have slightly different meanings from those of corresponding terms in Korean Patent Application Nos. 2007-43599 and 2007-43601, one in the relevant art can readily understand these terms.

Next, the diary list screen 700 is described in connection with FIG. 7.

Selection of the diary list tab 225b in the main screen 200 of FIG. 2 causes display of the diary list screen 700. The diary list screen 700 includes a diary listing zone 710 at the right-hand side, and a tag cloud zone 720 at the left-hand side. The diary listing zone 710 lists diary entries created by the user in order of date, and provides a search facility. When a diary entry created at a particular date is selected, the main screen 200 appears and the selected diary entry created at the date is displayed as a diary entry 610 in the right-hand zone 220 of the main screen 200.

The tag cloud zone 720 lists tags related to diary entries at multiple levels according to their frequencies, and provides a search facility for diary entries using tags. That is, tag clouds include tags that are attached to individual diary entries written by the user and listed at multiple levels according to frequencies. When the user selects a particular tag, diary entries having the selected tag are listed in the diary listing zone 710. Tag clouds can be related to 'people clouds' described in Korean Patent Application No. 2007-37435, filed by the same applicants as the present invention.

Figure 7:
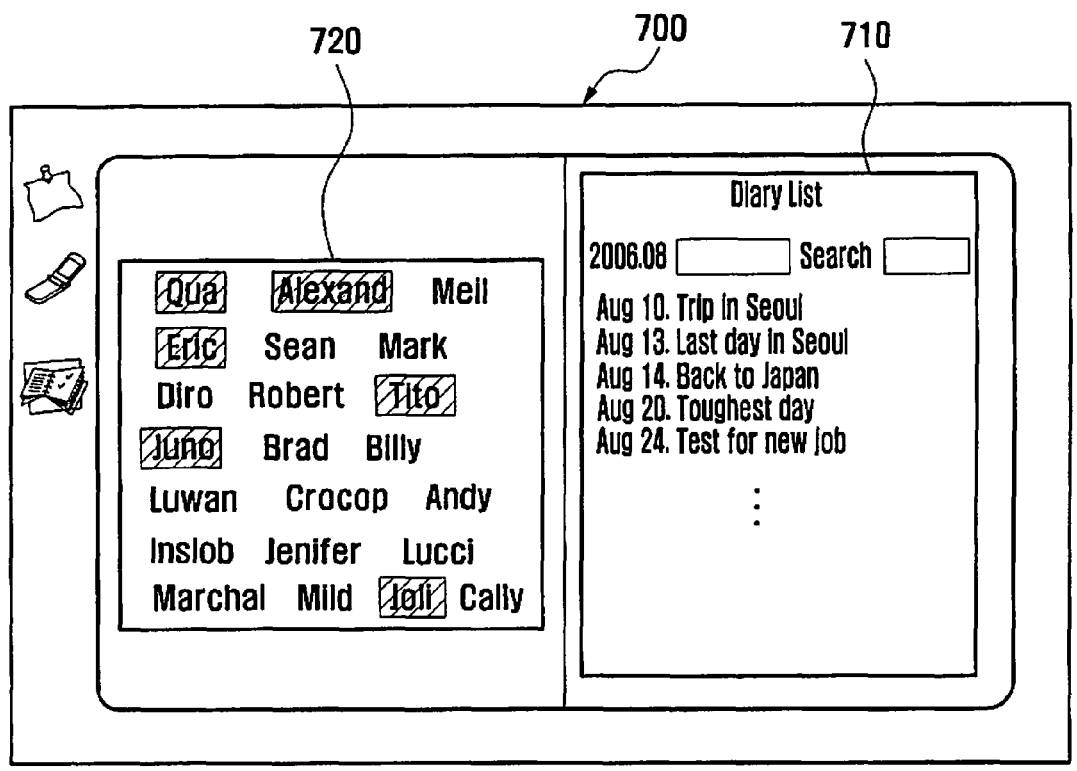
FIG. 7 illustrates a diary list screen of the application of FIG. 1.

A diary search tab and diary calendar tab may be provided at the upper end of the tag cloud zone 720, as illustrated in FIG. 7. These tabs also appear in the main screen 200, and enable diary entry search at the main screen 200 without switching to the diary list screen 700. Selection of the diary search tab causes display of a diary entry list as a pop-up on the main screen 200, and selection of the diary calendar tab causes display of a calendar to enable diary entry search using dates.

Hereinabove, menus, screen layouts, and functions of the life diary application according to the present invention are described. A life diary application, as well as other applications, are examples of date-based integrated processing of data. The present invention is not limited to a life diary application, and may be applied to various implementations of date-based integrated processing of data.

A life diary application can be executed on a mobile terminal creating data, or on a separate mobile terminal or information processing appliance. For example, a mobile terminal executes the life diary application using data created by the mobile terminal. Alternatively, the mobile terminal sends the created data to a separate information processing appliance, such as a mobile terminal, computer, Web server, terminal connected to the Web, etc., which then executes the life diary application using the received data. Hence, a data processing apparatus for integrated processing of data and execution of a life diary application or another application is not limited to a particular device.

As described above, the data processing apparatus of the present invention classifies all kinds of data based on dates and displays the classified data in various manners.

Figure 8:
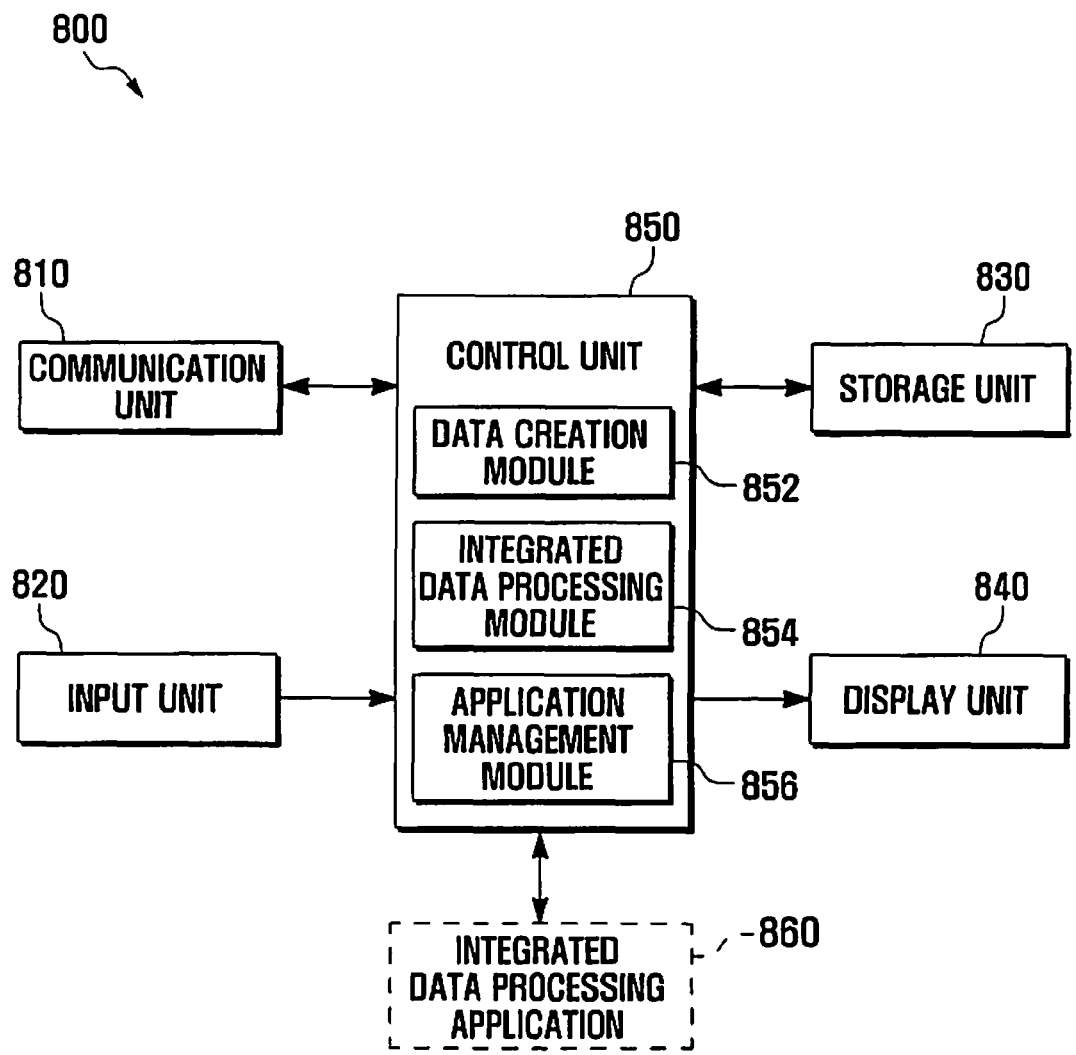
FIG. 8 is a data processing apparatus for a mobile terminal according to another embodiment of the present invention.

FIG. 8 shows another example of a data processing apparatus 800 for a mobile terminal according to the present invention.

Referring to FIG. 8, the data processing apparatus 800 includes a communication unit 810, input unit 820, storage unit 830, display unit 840, and control unit 850. The control unit 850 includes a data creation module 852, integrated data processing module 854, and application management module 856. The data processing apparatus 800 may further include elements (not shown) such as a camera module, video processing unit, and audio processing unit including a speaker and microphone.

The data processing apparatus 800 can be applied to various mobile terminals and information processing appliances. A mobile phone, digital camera, Personal Digital Assistant (PDA), MP3 audio player, Portable Multimedia Player (PMP), mobile broadcast receiver, portable navigation assistant, and electronic dictionary are examples of mobile terminals. A desktop computer, notebook computer, Web server, and terminal connected to the Web are examples of information processing appliances.

The communication unit 810 communicates with another mobile terminal or an information processing appliance through wired or wireless communication, for data transmission and reception. As widely known in the art, a Universal Serial Bus (USB) and IEEE 1394 can be used for wired communication. Code Division Multiple Access (CDMA), Global System for Mobile communications (GSM), Wideband CDMA (WCDMA), Universal Mobile Telecommunications System (UMTS), Wireless Local Area Network (WLAN), Bluetooth, Infrared Data Association (IrDA), ZigBee, and Ultra Wide Band (UWB) can be used for wireless communication. The communication unit 810 may include a communication interface and port for wired communication, and may include a wireless communication module and antenna for wireless communication.

The input unit 820 generates an input signal according to a user operation, and sends the input signal to the control unit 850. The input unit 820 includes at least one input device such as a keyboard, mouse, microphone, keypad, pointing device, or touch screen. For example, when the user selects a date as a priority reference for integrated processing of created data, the input unit 820 sends the selected date to the control unit 850.

The storage unit 830 stores various programs and data to be executed and processed under the control of the control unit 850. The storage unit 830 is composes of at least one volatile memory device and at least one non-volatile memory device. In particular, the storage unit 830 stores data created in response to events or received from another appliance, and an integrated data processing application 860 as a piece of software.

The display unit 840 displays various information on the screen under the control of the control unit 850. The display unit 840 includes one of display devices based on liquid crystal display (LCD), Plasma Display Panel (PDP), Organic Light Emitting Diodes (OLED), and Cathode Ray Tube (CRT). In particular, the display unit 840 displays various screens of the integrated data processing application 860, and also displays results obtained based on dates in formats compatible with the screens of the integrated data processing application 860.

The control unit 850 controls the overall operation of the data processing apparatus 800. In particular, the data creation module 852 creates data according to occurrences of events, and stores the created data in the storage unit 830. For example, when a communication operation is performed through the communication unit 810, the data creation module 852 creates log data. The data creation module 852 creates messages or e-mails to be sent, and collects received messages or e-mails. For other data types, the data creation module 852 creates data of a requested type and collects received data of the requested type, using corresponding applications.

In response to selection of a reference date, the integrated data processing module 854 collects pieces of data created at the reference date from the storage unit 830, and processes the pieces of data in an integrated manner according to preset processing conditions. The application management module 856 calls the integrated data processing application 860 from the storage unit 830, and initiates the integrated data processing application 860. The application management module 856 receives processing results from the integrated data processing module 854, and displays the results through the display unit 840 together with screens of the integrated data processing application 860.

The configuration and function of the data processing apparatus 800 will be more apparent from the following description of a data processing method.

Figure 9:
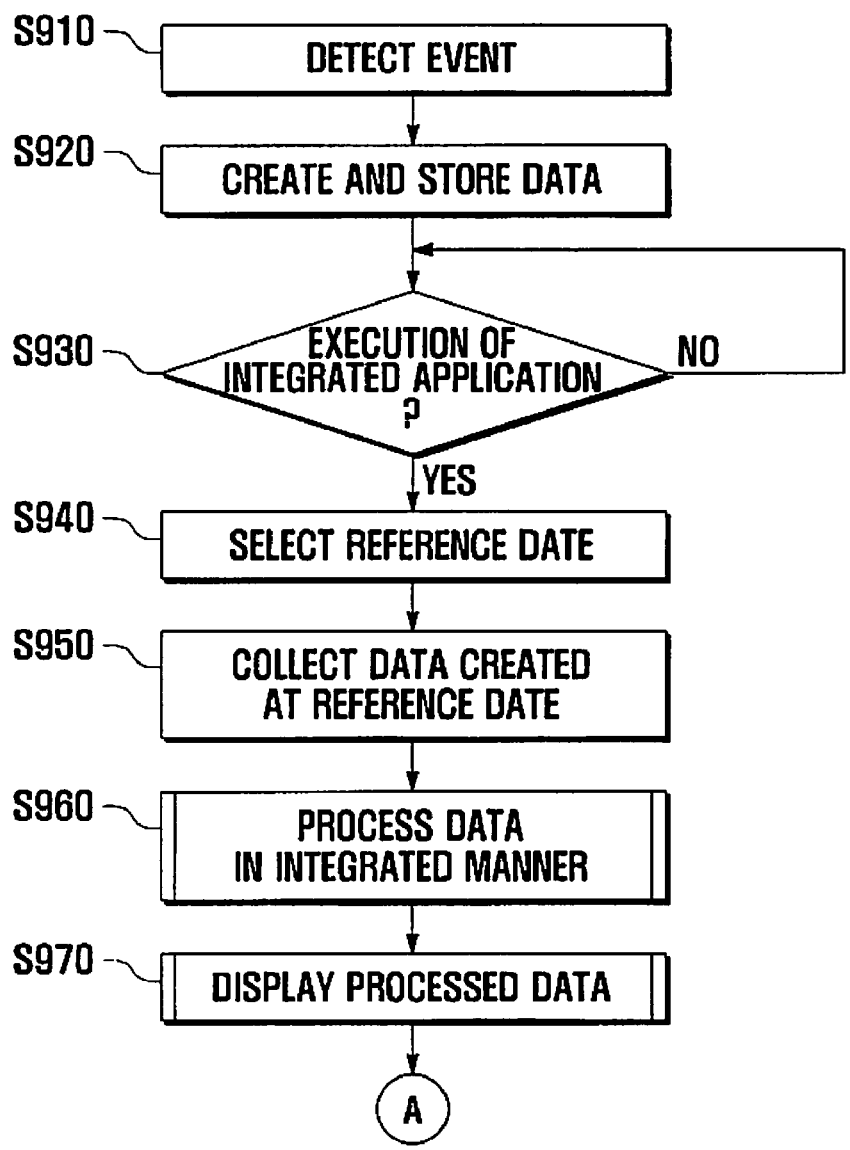
FIG. 9 is a flow chart illustrating a data processing method for a mobile terminal according to another embodiment of the present invention.

FIG. 9 shows another example of a data processing method for a mobile terminal according to the present invention.

Referring to FIGS. 8 and 9, when an event is detected in step S910, the data creation module 852 of the control unit 850 creates a piece of data corresponding to the detected event, and stores the created piece of data in the storage unit 830 in step S920. An event may correspond to call placement or reception, a call received in a no-answer state, message transmission or reception, e-mail transmission or reception, use of instant messaging, schedule writing, memo writing, alarm setting, audio recording or reception, or diary composition or reception. In response to an event, a piece of data, such as log data, message, e-mail, schedule, memo, alarm, image, video, audio, and diary entry may be created.

When the application management module 856 initiates the integrated data processing application 860 in step S930, the integrated data processing module 854 selects a reference date for integrated data processing in step S940. The integrated data processing application 860 is stored in the storage unit 830, and is executed when a call is made from the application management module 856. For example, a user request, arrival of a planned time, and creation of new data may cause the application management module 856 to call the integrated data processing application 860. At step S940, the reference date is today by default, and can be set to a date selected by the user.

The integrated data processing module 854 collects pieces of data created at the reference date from the storage unit 830 in step S950, and processes the collected pieces of data according to preset processing conditions in an integrated manner in step S960. At step S950, the integrated data processing module 854 searches data in the storage unit 830 to extract pieces of data whose creation dates are equal to the reference date. At step S960, the integrated data processing module 854 performs operations such as classification, summation and extraction upon the extracted pieces of data according to preset processing conditions irrespective of their types. Thereafter, the application management module 856 displays processing results from the integrated data processing module 854 together with associated screens of the integrated data processing application 860 on the display unit 840 in step S970.

Figure 10:
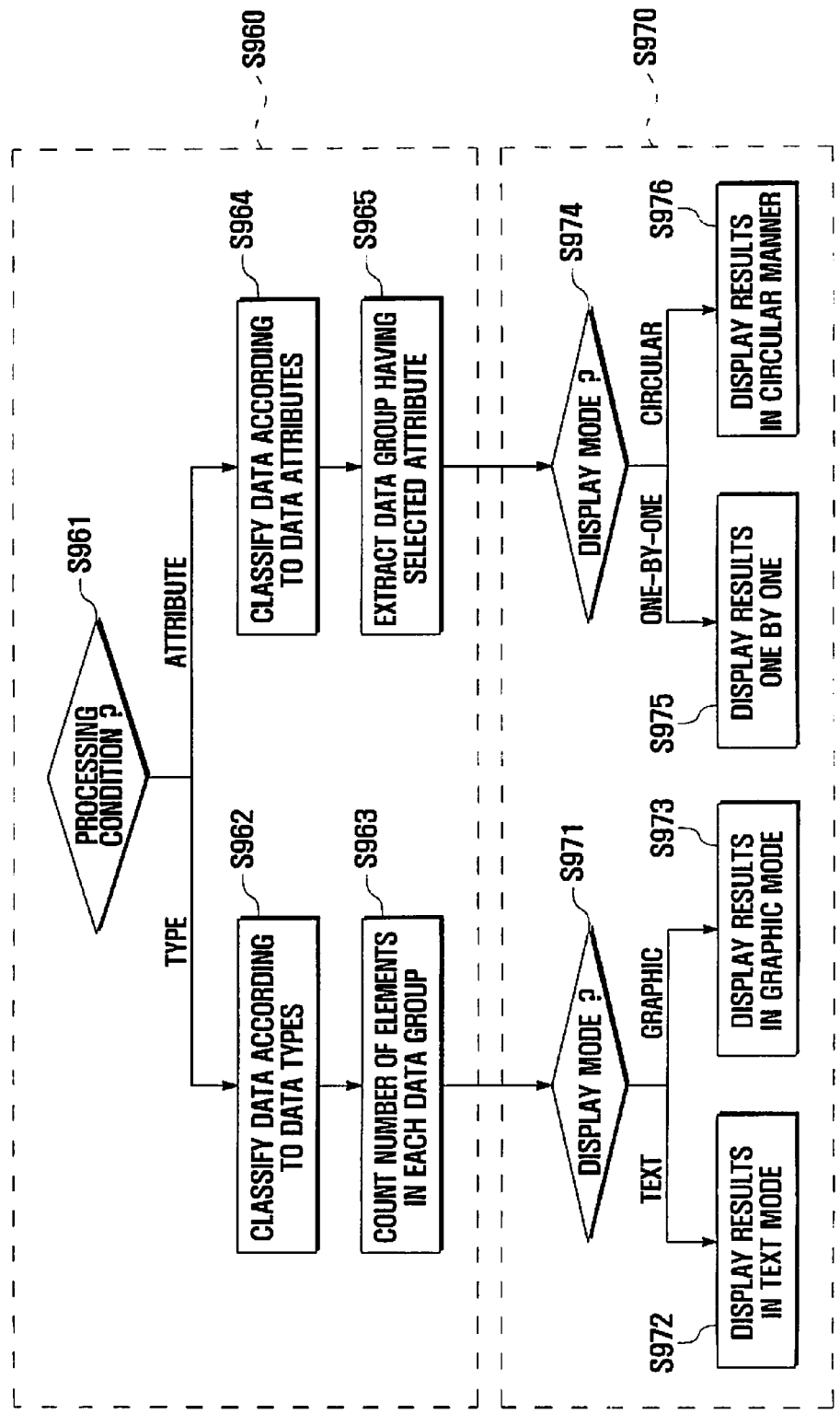
FIG. 10 is a flow chart illustrating a data processing step and data display step in the method of FIG. 9.

FIG. 10 is a flow chart illustrating a data processing step in step S960 and data display step in step S970 in the data processing method of FIG. 9.

Referring to FIG. 10, the integrated data processing module 854 examines processing conditions in step S961. For example, the processing conditions can be set in terms of data types and attributes.

A data type, as a processing condition, can be used to derive statistics of pieces of data created at a selected date based on data types. A data attribute can be used to extract and display pieces of data that are created at a selected date and have the data attribute. In the life diary application, the today's data statistics 212 in the main screen 200 of FIG. 2, and the filter 540 in the browser screen 500 of FIG. 5 correspond to the use of the data types. The today's content 214 and today's person 215 in the main screen 200 of FIG. 2 correspond to the use of the data attributes. As described previously, the today's content 214 is used to display pieces of data created by the user at a selected date, and the today's person 215 is used to display pieces of data created by a person other than the user at a selected date.

If the processing conditions are based on a data type, the integrated data processing module 854 classifies collected pieces of data according to data types in step S962, and counts the number of elements in each classified group of data in step S963. If the processing conditions are based on a data attribute, the integrated data processing module 854 classifies collected pieces of data according to data attributes in step S964, and extracts a group of data having the attribute in step S965.

Subsequent procedures after examination of the processing conditions need not be performed independently of each other, and may be performed in combination. Like the event of the today's content 214 and today's person 215, plural procedures can be performed independently of each other under the same kinds of processing conditions. Although not shown in FIG. 10, like the event of the today's data list 222 in the main screen 200 of FIG. 2, pieces of data created at a selected date can be listed in order of time without specifying a processing condition.

Thereafter, in step S970, the application management module 856 determines a display mode for displaying the processing results from the integrated data processing module 854. That is, for derivation of statistics, the application management module 856 determines the display mode in step S971. If the display mode is a text mode, the application management module 856 displays the results on the screen of the display unit 840 in the text mode in step S972. If the display mode is a graphic mode, the application management module 856 displays the results on the screen of the display unit 840 in the graphic mode in step S973. For extraction of data based on a selected attribute, the application management module 856 determines the display mode in step S974. If the display mode is a one-by-one mode, the application management module 856 separately displays the results on the screen of the display unit 840 one by one in step S975. If the display mode is a circular mode, the application management module 856 displays the results on the screen of the display unit 840 in a circular manner in step S976.

Figure 11:
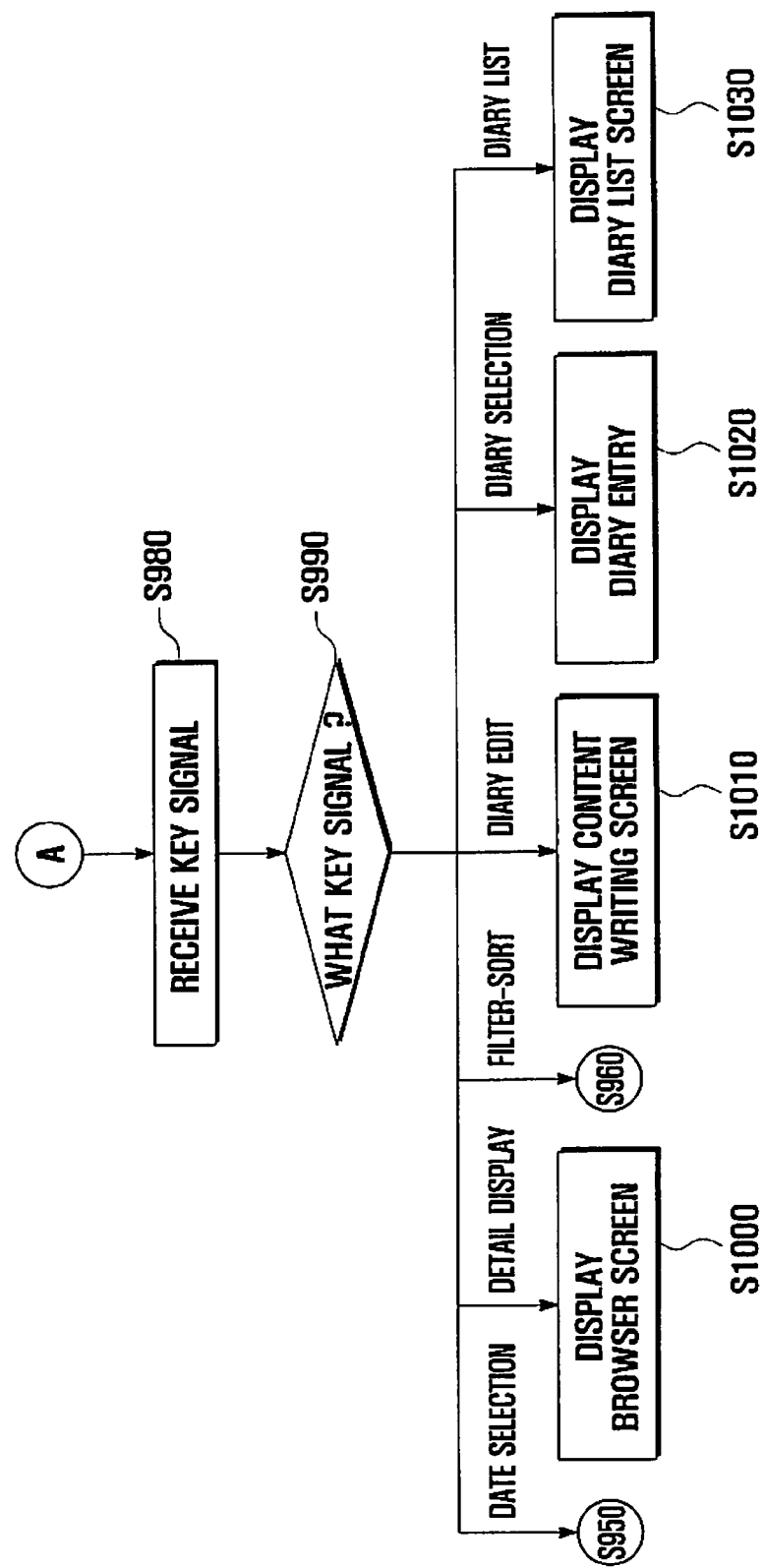
FIG. 11 is a flow chart illustrating subsequent steps following the steps shown in FIG. 10.

The data processing method may have additional steps after the data display step S970 as illustrated in FIG. 11.

Referring to FIGS. 8 and 11, when a key signal is input in step S980, the control unit 850 checks the input key signal in step S990.

If the input key signal indicates selection of a new date, the integrated data processing module 854 returns to step S950 for processing pieces of data created at the new date. In the life diary application, this corresponds to selection of a new date through the calendar 216 in the main screen 200 of FIG. 2.

If the input key signal indicates a detail display request, the application management module 856 reads the browser screen 500 from the storage unit 830, displays the browser screen 500 on the display unit 840, and also displays target pieces of data in detail on the browser screen 500 in step S1000. In the life diary application, the detail display request may correspond to selection of a particular type in the today's data statistics 212 in the main screen 200 of FIG. 2, to selection of one of pieces of data currently displayed in the today's content 214, or to selection of one of persons currently displayed in the today's person 215.

If the input key signal indicates a filter or sort function, the integrated data processing module 854 returns to step S960 for processing pieces of data according to a processing condition associated with the filter or sort function. In the life diary application, the filter or sort function corresponds to selection of the filter/sort 221 in the main screen 200 of FIG. 2.

If the input key signal indicates a diary edit request, the application management module 856 reads the content writing screen 600 from the storage unit 830, and displays the content writing screen 600 on the display unit 840 in step S1010. In the life diary application, the diary edit request corresponds to selection of the diary edit menu 223 in the main screen 200 of FIG. 2. At step S1010, the application management module 856 can provide a content selection screen before or together with the content writing screen 600 for diary writing, and provide an existing diary entry together with the content writing screen 600 for diary revision.

If the input key signal indicates a diary entry call, the application management module 856 reads a diary entry of a desired date from the storage unit 830, and displays the diary entry on the display unit 840 in step S1020. In the life diary application, the diary entry call corresponds to selection of the daily diary tab 224*b* of the upper tabs 224 or to selection of the today's diary tab 225*a* of the right-hand tabs 225 in the main screen 200 of FIG. 2.

If the input key signal indicates a diary list request, the application management module 856 reads the diary list screen 700 from the storage unit 830, and displays the diary list screen 700 on the display unit 840 in step S1030. In the life diary application, the diary list request corresponds to selection of the diary list tab 225*b* of the right-hand tabs 225 in the main screen 200 of FIG. 2.

The data processing method described above is applied to the case where creation of data and processing of the data occur at the same device. The data processing method of the present invention may also be applicable to the case where creation of data and processing of the data occur at separate devices, and the following description is related thereto.

Figure 12:
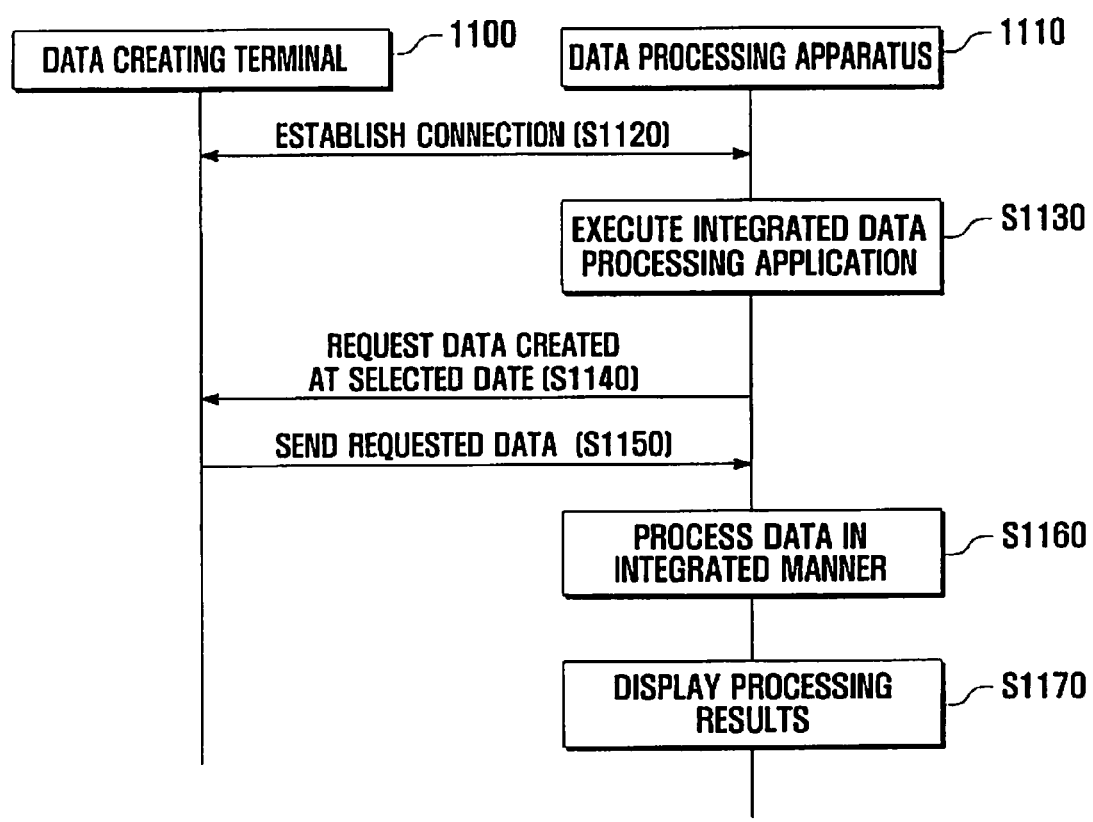
FIG. 12 is a sequence diagram illustrating a data processing method for a mobile terminal according to another embodiment of the present invention.

FIG. 12 is a sequence diagram illustrating another example of a data processing method for a mobile terminal according to the present invention.

Referring to FIG. 12, a data creating terminal 1100 and a data processing apparatus 1110 are connected to each other through a wired or wireless link in step S1120. For example, a mobile terminal is connected to a personal computer through a USB or Bluetooth link.

Upon detection of connection of the data creating terminal 1100, the data processing apparatus 1110 executes the integrated data processing application 860 in step S1130. The integrated data processing application 860 can be configured so that it is automatically executed in response to connection of the data creating terminal 1100.

Thereafter, the data processing apparatus 1110 sends a request for data created at a reference date to the data creating terminal 1100 in step S1140. The reference date is today by default, and can be another date selected by the user.

In reply to the request, the data creating terminal 1100 collects pieces of data created at the reference date, and sends the collected pieces of data to the data processing apparatus 1110 in step S1150. That is, the data creating terminal 1100 sends all data created at the reference date irrespective of types to the data processing apparatus 1110.

The data processing apparatus 1110 stores the pieces of data from the data creating terminal 1100, and processes the pieces of data according to preset processing conditions in step S1160. Step S1160 corresponds to the data processing step S960 described in connection with FIGS. 9 and 10, and a repeated description is omitted.

The data processing apparatus 1110 displays processing results on the display unit 840 together with screens of the integrated data processing application 860 in step S1170. Step S1170 corresponds to the data display step S970 described in connection with FIGS. 9 and 10, and a repeated description is omitted.

The data processing method of the present embodiment may further include a step of sending the processing results to the data creating terminal 1100 (not shown) after step S1160. The data processing method may further include additional steps described in connection with FIG. 11 after step S1170.

Figure 13:
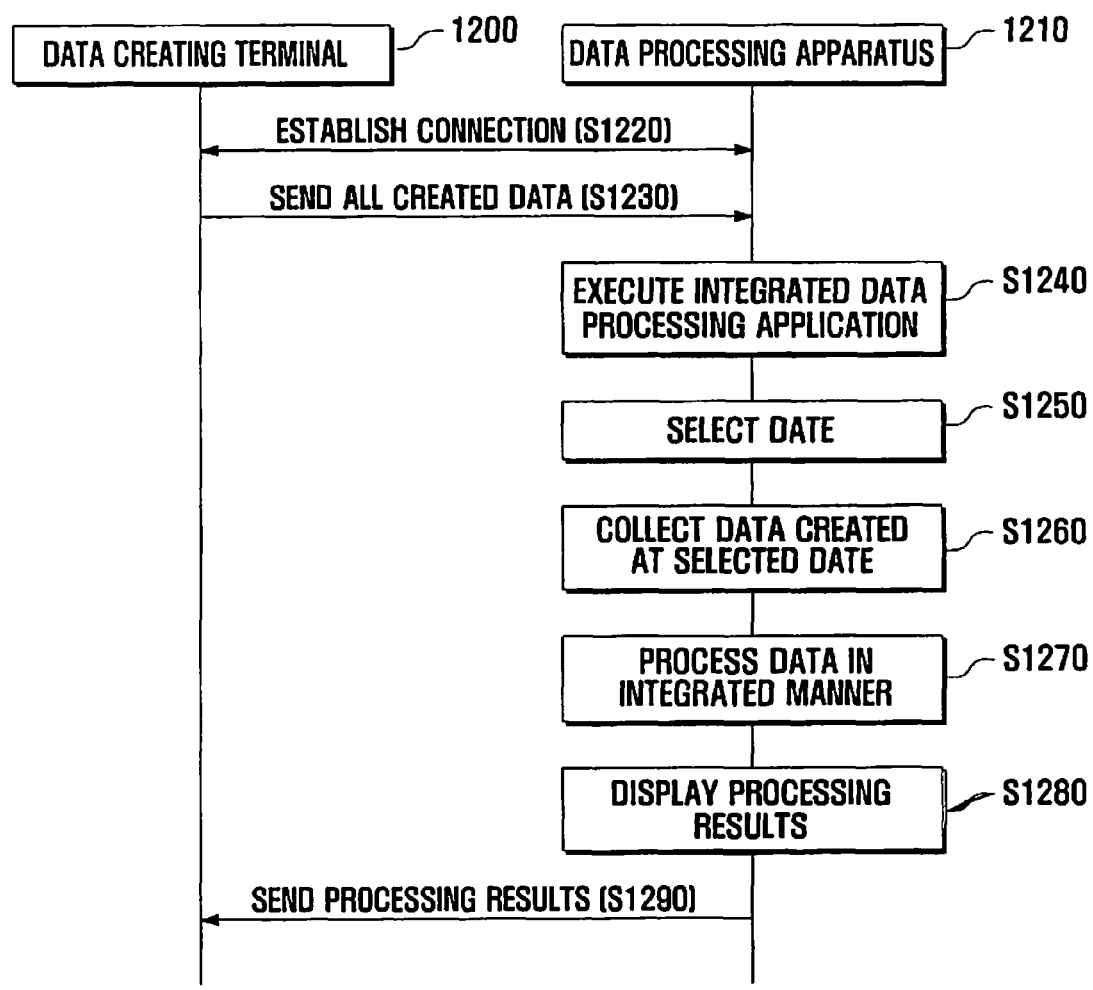
FIG. 13 is a sequence diagram illustrating a data processing method for a mobile terminal according to another embodiment of the present invention.

FIG. 13 is a sequence diagram illustrating another example of a data processing method for a mobile terminal according to the present invention.

Referring to FIG. 13, a data creating terminal 1200 and a data processing apparatus 1210 are connected to each other through a wired or wireless link in step S1220.

After connection, the data creating terminal 1200 sends all created data to the data processing apparatus 1210 in step S1230.

Upon reception of the created data, the data processing apparatus 1210 stores the received data and executes the integrated data processing application 860 in step S1240. The integrated data processing application 860 can be configured so that it is automatically executed before or after reception of the created data.

The data processing apparatus 1210 sets a reference date in step S1250. The reference date is today by default, and can be another date selected by the user.

The data processing apparatus 1210 collects pieces of data created at the reference date in step S1260, and processes the collected pieces of data in an integrated manner according to preset processing conditions in step S1270. Step S1270 corresponds to the data processing step S960 described in connection with FIGS. 9 and 10, and a repeated description is omitted.

The data processing apparatus 1210 displays processing results on the display unit 840 together with screens of the integrated data processing application 860 in step S1280, and sends the processing results to the data creating terminal 1200. Step S1280 corresponds to the data display step S970 described in connection with FIGS. 9 and 10, and a repeated description is omitted. The data processing method may further include additional steps described in connection with FIG. 11 after step S1280.

As apparent from the above description, the present invention provides a method and apparatus wherein data generated in a mobile terminal can be classified in an integrated manner based on dates and can be displayed in various forms, thereby enabling efficient management of user data and effective use thereof. For example, the data processing method of the present invention can readily provide the user with information regarding types of data created at a selected date, pieces of data of a particular type created at a selected date, pieces of data created by the user at a selected date, pieces of data received elsewhere at a selected date, and senders and pieces of data sent by the senders at a selected date. In addition, as user data is processed based on of dates, the data processing method can be useful for diary writing. Integrated processing of various types of data enables the user to make diary entries using multimedia information beyond text-only information. Further, data generated in a mobile terminal can be processed by the mobile terminal or be sent to and processed by a separate information processing appliance, such as another mobile terminal, computer, Web server, etc. Hence, the data processing method is very scalable.

While preferred embodiments of the present invention have been shown and described in this specification, it will be understood by those skilled in the art that various changes or modifications of the embodiments are possible without departing from the spirit and scope of the invention as defined by the appended claims.

What is claimed is:

1. A data processing apparatus for a mobile terminal, the apparatus comprising:

a storage unit for storing data and an integrated data processing application;

a display unit for displaying data and screens of the integrated data processing application;

an integrated data processing module for selecting a reference date, collecting pieces of data created at the reference date from the storage unit, and processing the collected pieces of data in an integrated manner according to preset processing conditions; and an application management module for reading the integrated data processing application from the storage unit for execution, and displaying processing results on the display unit together with associated screens of the integrated data processing application, wherein the processing conditions are at least two in number, the integrated data processing module processes pieces of data into groups of results according to each of the processing conditions, and the application management module displays the groups of results separately from each other, wherein the groups of results include a tag cloud zone and the tag cloud zone includes tag clouds which include tags that are attached to individual diary entries written by a user and listed at multiple levels according to frequencies.

2. The data processing apparatus of claim 1, further comprising a data creation module for creating, in response to an event, a piece of data and storing the created piece of data in the storage unit.

3. The data processing apparatus of claim 1, further comprising a communication unit for sending and receiving a piece of data through a wired or wireless connection.

4. The data processing apparatus of claim 1, wherein the integrated data processing module selects today as the reference date by default.

5. The data processing apparatus of claim 1, wherein the processing conditions comprise derivation of type-based statistics and display of data having a selected attribute.

6. The data processing apparatus of claim 1, wherein the user data comprises log data, messages, electronic mails, schedules, memos, alarms, images, videos, audios, and diaries.

7. The data processing apparatus of claim 1, wherein the integrated data processing application is a life diary application.

8. A data processing method for a mobile terminal, the method comprising:
   executing an integrated data processing application for integrated processing of data;
   selecting a reference date;
   collecting pieces of data created at the reference date regardless of their types;
   processing the collected pieces of data in an integrated manner according to preset processing conditions; and
   displaying processing results together with associated screens of the integrated data processing application,
   wherein processing the collected pieces of data comprises processing the collected pieces of data into groups of results according to two or more processing conditions, and displaying processing results comprises displaying the groups of results separately from each other,
   wherein the groups of results include a tag cloud zone and the tag cloud zone includes tag clouds which include tags that are attached to individual diary entries written by a user and listed at multiple levels according to frequencies.

9. The data processing method of claim 8, further comprising creating, in response to an event before execution of the integrated data processing application, a piece of data and storing the created piece of data.

10. The data processing method of claim 8, further comprising:
   detecting, before execution of the integrated data processing application, connection of the mobile terminal having created data; and
   receiving the data from the mobile terminal.

11. The data processing method of claim 10, further comprising sending, after processing the collected pieces of data, the processing results to the mobile terminal.

12. The data processing method of claim 9, wherein the event corresponds to one of call placement or reception, reception of an unanswered call, message transmission or reception, e-mail transmission or reception, use of instant messaging, schedule writing, memo writing, alarm setting, audio recording or reception, and diary composition or reception.

13. The data processing method of claim 8, wherein the user data comprises log data, messages, electronic mails, schedules, memos, alarms, images, videos, audios, and diaries.

14. The data processing method of claim 13, wherein the user data comprises attributes including types, created dates and times, sizes, formats, and creators.

15. The data processing method of claim 9, wherein one of a user request, arrival of a planned time, and creation of new data initiates execution of the integrated data processing application.

16. The data processing method of claim 10, wherein connection of the mobile terminal automatically initiates execution of the integrated data processing application.

17. The data processing method of claim 8, wherein selecting a reference date comprises one of setting the reference date to today by default, and setting the reference date to a date selected by a user.

18. The data processing method of claim 8, wherein collecting pieces of data created at the reference date comprises extracting pieces of data whose creation dates are equal to the reference date.

19. The data processing method of claim 8, wherein processing the collected pieces of data comprises if the processing conditions are based on a date type, classifying the collected pieces of data into groups of data on the basis of types, and counting the number of elements in each group of data, and if the processing conditions are based on a data type and a data attribute, classifying the collected pieces of data into groups of data based on the basis of attributes, and extracting one of the groups whose elements have a selected attribute.

20. The data processing method of claim 8, wherein displaying processing results comprises displaying the processing results in a text or graphic mode, or displaying the processing results one by one or in a circular manner.

21. The data processing method of claim 8, further comprising:
   inputting, after display of the processing results, a key signal;
   checking the input key signal; and
   performing a necessary procedure indicated by the input key signal.

22. The data processing method of claim 21, wherein the input key signal indicates one of date selection, detail display, filtering, sorting, diary editing, diary calling, and diary entry listing.

23. The data processing method of claim 8, wherein the integrated data processing application is a life diary application.

* * * * *